Dec. 12, 1939.   F. G. BOUCHER   2,183,115
MULTIPLE GRAVITY METER
Filed June 20, 1936   3 Sheets-Sheet 1
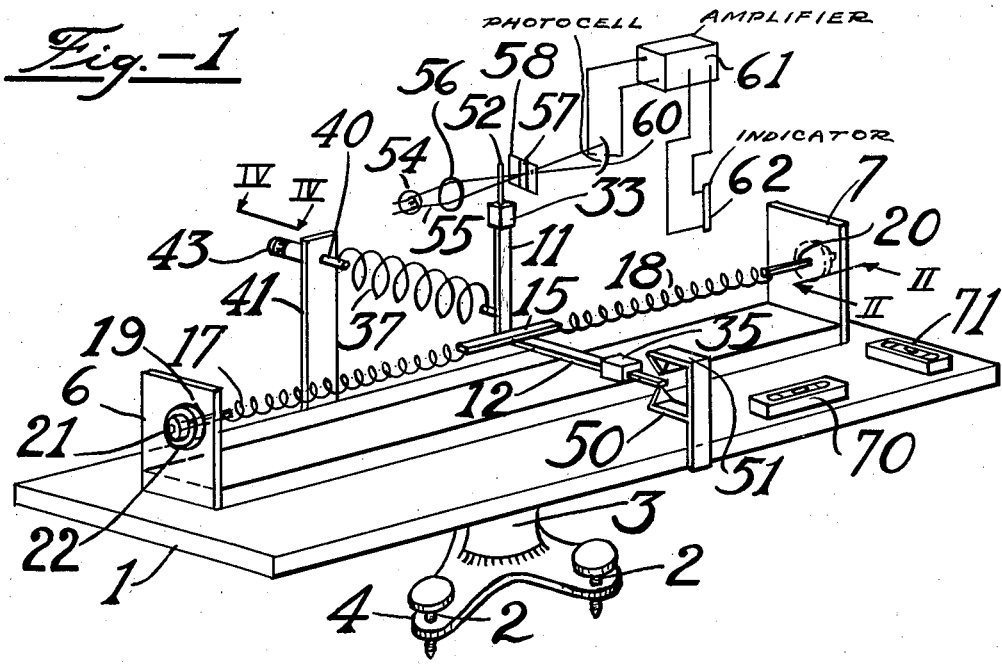
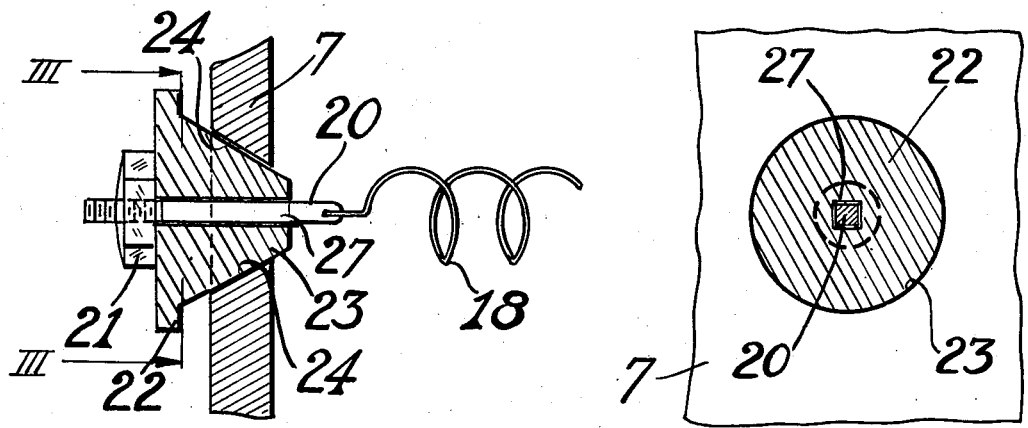
Frank G. Boucher Inventor
By W. F. Weigester Attorney

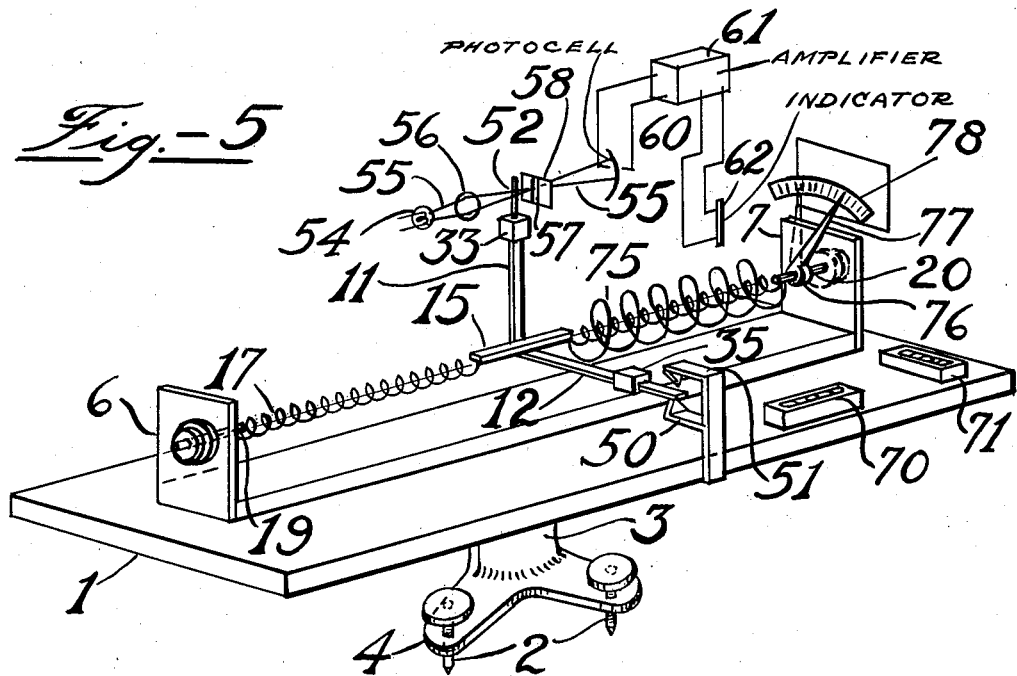
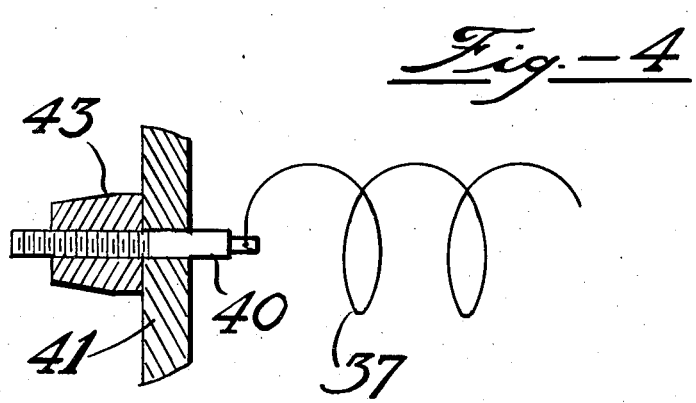

Dec. 12, 1939.  F. G. BOUCHER  2,183,115
MULTIPLE GRAVITY METER
Filed June 20, 1936   3 Sheets-Sheet 3

Frank G. Boucher Inventor
By W. F. Weigester Attorney

Patented Dec. 12, 1939

2,183,115

UNITED STATES PATENT OFFICE 2,183,115

MULTIPLE GRAVITY METER

Frank G. Boucher, Houston, Tex., assignor to Standard Oil Development Company, a corporation of Delaware Application June 20, 1936, Serial No. 86,243

4 Claims. (Cl. 265—1.4)

This invention relates to improvements in gravity meters.

The invention will be fully understood from the following description taken in connection with the accompanying drawings, in which latter—

Fig. 1 is a perspective view of a preferred form of gravity meter using a delicate tension adjustment spring.

Fig. 2 is a longitudinal sectional view taken along line II—II of Fig. 1 showing the adjusting device.

Fig. 3 is a transverse sectional view taken along line III—III of Fig. 2.

Fig. 4 is a transverse sectional view taken along the line IV—IV of Fig. 1.

Fig. 5 is a perspective view of a modified form of gravity meter using a torsional fine adjustment spring.

Figure 6:
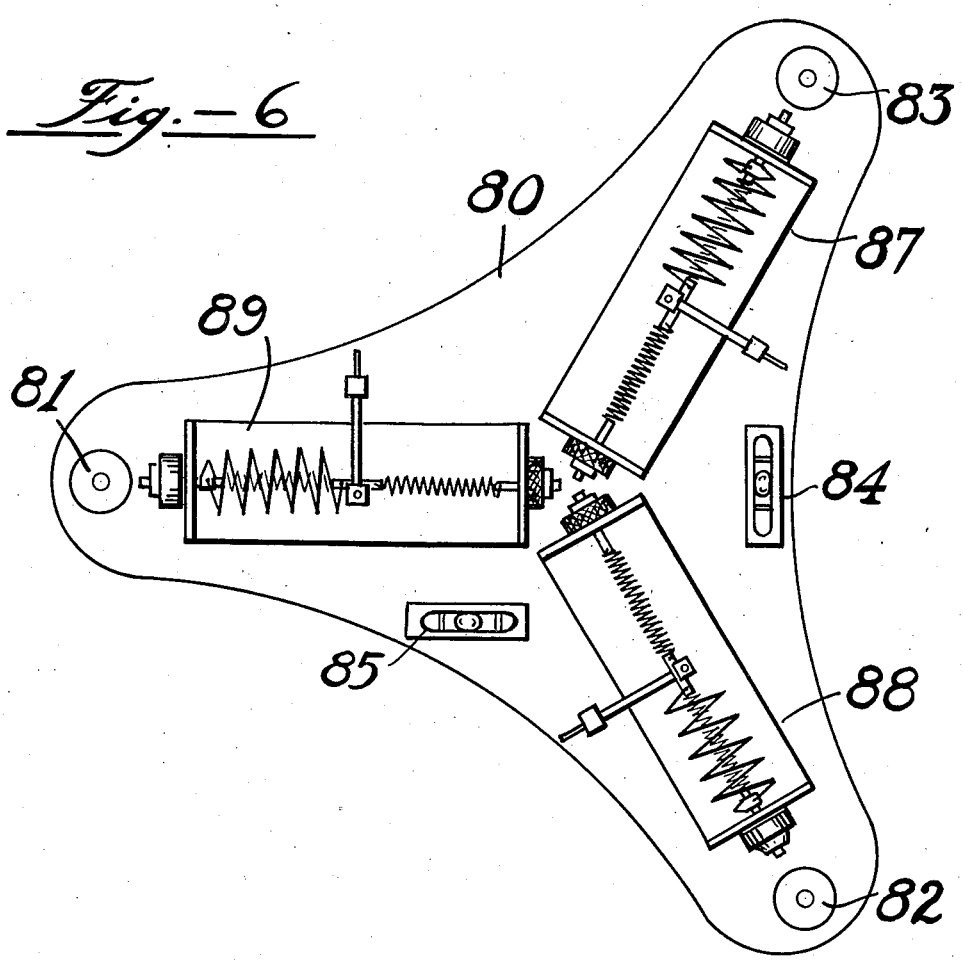
Fig. 6 is a top plan view showing three of the instruments illustrated in Fig. 5 mounted upon a common base around a common point together with means for leveling the base.

Referring particularly to Fig. 1, the device comprises a base 1 mounted upon a pedestal provided with a plurality of leveling screws 2. The upright 3 of the pedestal is rotatably mounted with respect to its feet 4 to permit of rotating the base 1 about a vertical axis. The base 1 is provided with upwardly extending brackets 6 and 7 disposed in spaced relation to each other to permit of suspending a moving system therebetween.

The moving system of the gravity meter includes arms 11 and 12 which protrude at right-angles to each other from a common hub member 15. Horizontally disposed tension springs 17 and 18 are connected at their adjoining ends to the hub member 15. The outer ends of the spring members 17 and 18 are connected to rods 19 and 20 which protrude through the brackets 6 and 7 and are secured by suitable adjusting means to be now described. The rod 20 is rectangular in cross-section, as shown in Fig. 3, and the outer end of the rod is screw-threaded. The rod 20 is held in position by means of a nut 21 threaded on the rod, the nut bearing against a member 22, the outer surface of which is conical as indicated at 23, to bear against the conical walls 24 of the opening of the bracket 7 through which the rod 20 passes. The bore 27 of the member 22 is rectangular in shape, as illustrated in Fig. 3, in order to fit with the rectangular cross section of the rod 20. Longitudinal movement of the rod 20 is effected by rotating the nut 21, thereby drawing the rod 20 away from the hub member 15 or toward it to increase or decrease the tension on spring 18 as may be desired. Torque is applied to the spring 18 by rotating the member 22 which in turn rotates the rod 20. A similar arrangement of parts is connected to the rod 19 for controlling the tension and torque of the spring 17, and like reference numerals have been applied to like parts.

The weight system including the arms 11 and 12 which protrude at right-angles from the hub member 15 is supported in position by the springs 17 and 18, as previously described, with the arm 11 projecting vertically upwardly and the arm 12 extending in a horizontal position. The arm 11 is provided with a weight 33 and the sensitivity of the instrument can be adjusted by moving the weight 33 vertically upon the arm 11. Movement of the weight 33 upwardly increases the period of the instrument. The arm 12 carries a weight 35 which can be adjusted longitudinally of the arm 12. Variation in pull of gravity reacts upon the weight 35 to cause variation in position of the horizontal arm 12 about the hub member 15 as an axis.

Means are provided for restoring the moving system to balance. The means comprises a helical spring 37 one end of which is secured to the upright arm 11, as illustrated, and the other end of which is secured to a rod 40. The rod 40 passes through an opening in a support 41 disposed in fixed position with respect to the base 1. The rod 40 is screw-threaded and dial 43 threaded to the rod 40 bears against the support 41 as clearly shown in Figs. 1 and 4. Longitudinal movement of the rod 40 to apply tension to the helical spring 37 or to lessen the tension is thereby effected as may be desired. The spring 37 is tensioned in order to restore the weight system to balance. The spring 37 is very delicate as compared with the springs 17 and 18 and is used as a vernier in measuring the torque necessary to return the weight system to balance. Motion of the weight system is limited by means of stops 50 and 51. It will be understood that the torque can be applied to the system by suitably attaching the system to the arm 12, and some of the advantages of the invention will be retained.

The balanced position of the weight system is determined through the following arrangements of parts: The arm 11 carries a projection 52. In the balanced position the projection 52 interrupts a light beam 55 from a source of light 54. The light beam passes through a lens 56 which focuses it to pass through a slot 57 in a screen 58. The light falling on a photocell 60 actuates an amplifier 61 connected to the cell as illustrated. The amplified current of electricity is then passed to a suitable indicator 62 whereby it can be observed whether or not the beam of light falls upon the photocell, thereby indicating the position of the weight system. Other methods of indicating the balanced position of the system may be used, as for example a direct optical observation.

In utilizing the apparatus for measuring differences in the pull of the earth's gravity, the instrument is set up and leveled by means of leveling screws 2 and the spirit levels 70 and 71, which in the preferred embodiment are disposed at right angles to each other. The weight system is then brought into balance by adjusting the tension of the spring 37 by means of the dial 43 and the reading of the dial is noted. Balance of the instrument is indicated when the projection 52 obstructs the beam of light from light source 54 so that the indicator 62 shows no current. The instrument is then moved to a new station and the instrument is again leveled. If there is a difference in gravity between this station and the former station, the weight system will be found to be out of balance. The system is restored to balance by means of the spring 37 and the position of the dial 43 is noted. The change in position of the dial 43 provides a means of determining the difference in gravity between the two stations.

In the embodiment illustrated in Fig. 1, the necessary torque is applied to the weight system to bring it into balance by the application of tension to the spring 37. In the embodiment illustrated in Fig. 5, the necessary torque is applied to the weight system to bring it into balance by the application of torque to a hair spring 75. The weight system and the optical system for indicating balance is identical with that illustrated in Fig. 1, and like reference numerals have been applied to like parts. The spring 75 is connected at one end to the weight system. The opposite end of the spring 75 is connected to a sleeve 76 freely mounted upon the rod 20. The sleeve 76 carries a pointer 77 which moves across a dial 78 suitably secured in stationary position to permit of a reading being taken. The relative position of the pointer indicates the amount of torque applied to the spring 75. The instrument is used exactly as described in connection with Fig. 1 to measure variations of the pull of the earth's gravity. The weight system is positioned in equilibrium position for the initial reading and is restored to equilibrium position after change due to a variation of the pull of gravity by moving the pointer 77 until the projection 52 shuts off the beam of light from the photocell. A reading of the pointer 77 is then taken upon the scale 78.

Gravity meters in general are very sensitive to leveling. I have been able to overcome the accompanying errors in the gravity readings by obtaining readings of the gravity meter in different azimuths. In accomplishing the leveling, the instrument is leveled as accurately as possible by means of the leveling screws 2. A reading is then taken of the instrument. The instrument is now rotated through an angle of, for example 120 degrees where another reading of the instrument is taken. A further reading of the instrument is obtained after the instrument has been again rotated through an angle of, for example 120 degrees, after which a final reading of the instrument is obtained in its initial position. Four readings in three azimuths are thus provided at each station. The mean of these readings is a better approximation to the true reading at the station than could be obtained by a single reading. It will be understood that while a 120 degree rotation is suggested that other angles may be used and some of the advantages of the invention retained.

Referring to Fig. 6, a modified arrangement for overcoming errors in gravity readings due to leveling errors is illustrated. The device is a composite instrument which comprises a base 80 which is supported by means of adjusting screws 81, 82 and 83 disposed at opposite edges of the base. Levels 84 and 85 are carried by the base preferably at right-angles to each other, as illustrated. Gravity meters 87, 88 and 89, each identical with the gravity meter illustrated in Fig. 5, are mounted directly upon the base 80. The gravity meters are disposed around a central point, as illustrated. In the embodiment illustrated, the gravity meters are substantially equi-distantly spaced angularly around a common point. The meters are so disposed that their weight systems lie in different azimuths. Readings are taken as follows: The base 80 is leveled as carefully as possible and readings are then taken on each meter. The mean of these readings is a better approximation to the true reading at the station than could be obtained by the reading of a single instrument.

Various changes and alternate arrangements may be made within the scope of the appended claims, in which it is my intention to claim all novelty inherent in the art as broadly as the prior art permits.

I claim:

1. A gravity meter comprising a weight system including arms protruding at right-angles from a hub and a weight carried by each arm, aligned horizontally disposed tension springs, the adjoining ends of which are secured to the hub, means for applying tension and torque to the opposite ends of the springs whereby the weight system is maintained in position by the tension and torque of the springs with one arm substantially horizontal and the other arm extending vertically upwardly whereby variations in the pull of gravity affect the position of the weight system, means for restoring the system to its original position including a tension spring secured to the weight system and means for adjusting the tension of the spring to restore the system to its original position after displacement by gravity.

2. A gravity meter, comprising a weight system including arms protruding at right-angles from a hub and a weight carried by each arm, aligned horizontally disposed tension springs the adjoining ends of which are secured to the hub, means for applying tension and torque to the opposite ends of the springs whereby the weight system is maintained in position by the tension and torque of the springs with one arm substantially horizontal and the other extending vertically upwardly whereby variations in the pull of gravity affect the position of the weight system, a spring coaxial with the tension springs secured to the weight system, and means for adjusting the last mentioned spring to apply torque to the weight system to restore the system to its original position after displacement by gravity.

3. A gravity meter, comprising a weight system including arms protruding at right-angles from a hub and a weight carried by each arm, aligned horizontally disposed tension springs the adjoining ends of which are secured to the hub, means for applying tension and torque to the opposite ends of the springs whereby the weight system is maintained in position by the tension and torque of the springs with one arm substantially horizontal and the other arm extending vertically upwardly so that variations in the pull of gravity affect the position of the weight system, a helical spring secured to the weight system, and means for adjusting the torque of the helical spring to restore the system to its original position after displacement by gravity.

4. A gravity meter comprising a weight system including arms protruding at right angles from a hub and a weight carried by each arm, aligned horizontally disposed tension springs, the adjoining ends of which are secured to the hub, means for applying tension and torque to the opposite ends of the springs whereby the weight system is maintained in position by the tension and torque of the springs with one arm substantially horizontal and the other arm extending vertically upwardly whereby variations in the pull of gravity affect the position of the weight system, means for restoring the system to its original position including a helical spring secured to the weight system, and means for adjusting the spring to restore the system to its original position after displacement by gravity.

FRANK G. BOUCHER.